(12) United States Patent
Higashi

(10) Patent No.: US 7,853,367 B2
(45) Date of Patent: Dec. 14, 2010

(54) REMOTE ENGINE CONTROL SYSTEM

(75) Inventor: Akihiro Higashi, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 118 days.

(21) Appl. No.: 12/078,957

(22) Filed: Apr. 8, 2008

(65) Prior Publication Data
US 2008/0262662 A1 Oct. 23, 2008

(30) Foreign Application Priority Data
Apr. 19, 2007 (JP) ............................ 2007-110405

(51) Int. Cl.
*G05D 1/00* (2006.01)
*B60R 25/10* (2006.01)
(52) U.S. Cl. ..................... 701/2; 340/426.36
(58) Field of Classification Search ................ 701/2; 340/426.36
See application file for complete search history.

(56) References Cited

U.S. PATENT DOCUMENTS

| 7,069,119 B2 * | 6/2006 | Ueda et al. ............. 701/2 |
| 2006/0087405 A1 * | 4/2006 | Koike et al. ........... 340/5.64 |
| 2008/0106391 A1 * | 5/2008 | Santavicca et al. ..... 340/426.36 |

FOREIGN PATENT DOCUMENTS

| JP | A-2001-214840 | 8/2001 |
| JP | A-2002-112354 | 4/2002 |
| JP | A-2002-293216 | 10/2002 |
| JP | A-2006-303584 | 11/2006 |

* cited by examiner

Primary Examiner—Khoi Tran
Assistant Examiner—Ian Jen
(74) Attorney, Agent, or Firm—Oliff & Berridge, PLC

(57) ABSTRACT

In a remote engine control system, a relay device receives a vehicle equipment control request containing first identification information, updates the first identification information to second identification information, and transmits the updated vehicle equipment control request to an in-vehicle device.

7 Claims, 8 Drawing Sheets

US 7,853,367 B2

REMOTE ENGINE CONTROL SYSTEM

BACKGROUND OF THE INVENTION

1. Field of the Invention

The present invention relates to a remote engine control system for vehicles.

2. Description of the Related Art

Remote engine control systems are currently available that allow a user to remotely control and start an engine of a vehicle by operating a portable controller. Particularly, a user can, for example, remotely start a vehicle to warm up the engine, or remotely start the air conditioner or the audio system on the vehicle. To remotely control the vehicle, a signal is transmitted from the portable controller to the vehicle. To lengthen a transmission distance of a signal, for example, Japanese Patent Application Laid-open No. 2001-214840 and Japanese Patent Application Laid-open No. 2002-112354 teaches to use a relay unit or a relay device.

On the other hand, keys capable of short-distance radio communication are widely used that can electrically lock and unlock vehicles and facilitate locking and unlocking operation of vehicles. Such a key is called "remote key" or "radio key" (hereinafter, "remote key"). A technology has already been in practical use in which the engine of a vehicle is remotely controlled by signals from such a remote key without use of a dedicated operation terminal.

A remote key is originally use to control locking and unlocking of a vehicle or issuing an alarm (i.e., a panic alarm) for an area around the vehicle. Therefore, operation different from that for controlling locking and unlocking of a vehicle is required as a command operation for remotely starting the engine. Such operation could include pressing the button for locking the door repeatedly three times.

However, if the distance between the remote key and the vehicle is short, both the signals, i.e., the signal from the remote key and the signal relayed by the relay unit or the relay device, reach the vehicle.

In this case, a combination of the signals from the remote key and the relay terminal or the relay device may be recognized as a command (control signal) different from a command originally intended by the user for, for example, remotely controlling (starting) the engine. As a result, an erroneous command may be executed.

SUMMARY OF THE INVENTION

It is an object of the present invention to at least partially solve the problems in the conventional technology.

According to an aspect of the present invention, there is provided a remote engine control system that remotely controls an engine of a vehicle. The remote engine control system includes a relay device that receives a vehicle equipment control request containing first identification information, updates the first identification information in the vehicle equipment control request to second identification information to obtain an updated vehicle equipment control request, and transmits the updated vehicle equipment control request; and an in-vehicle device arranged in the vehicle. The in-vehicle device includes a determining unit that determines whether a vehicle equipment control request is acceptable based on identification information in the vehicle equipment control request; a command identifying unit that determines, when the vehicle equipment control request is acceptable, whether the vehicle equipment control request represents a command, and identifies a type of the command; and an engine control unit that remotely controls an engine of the vehicle based on the command.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
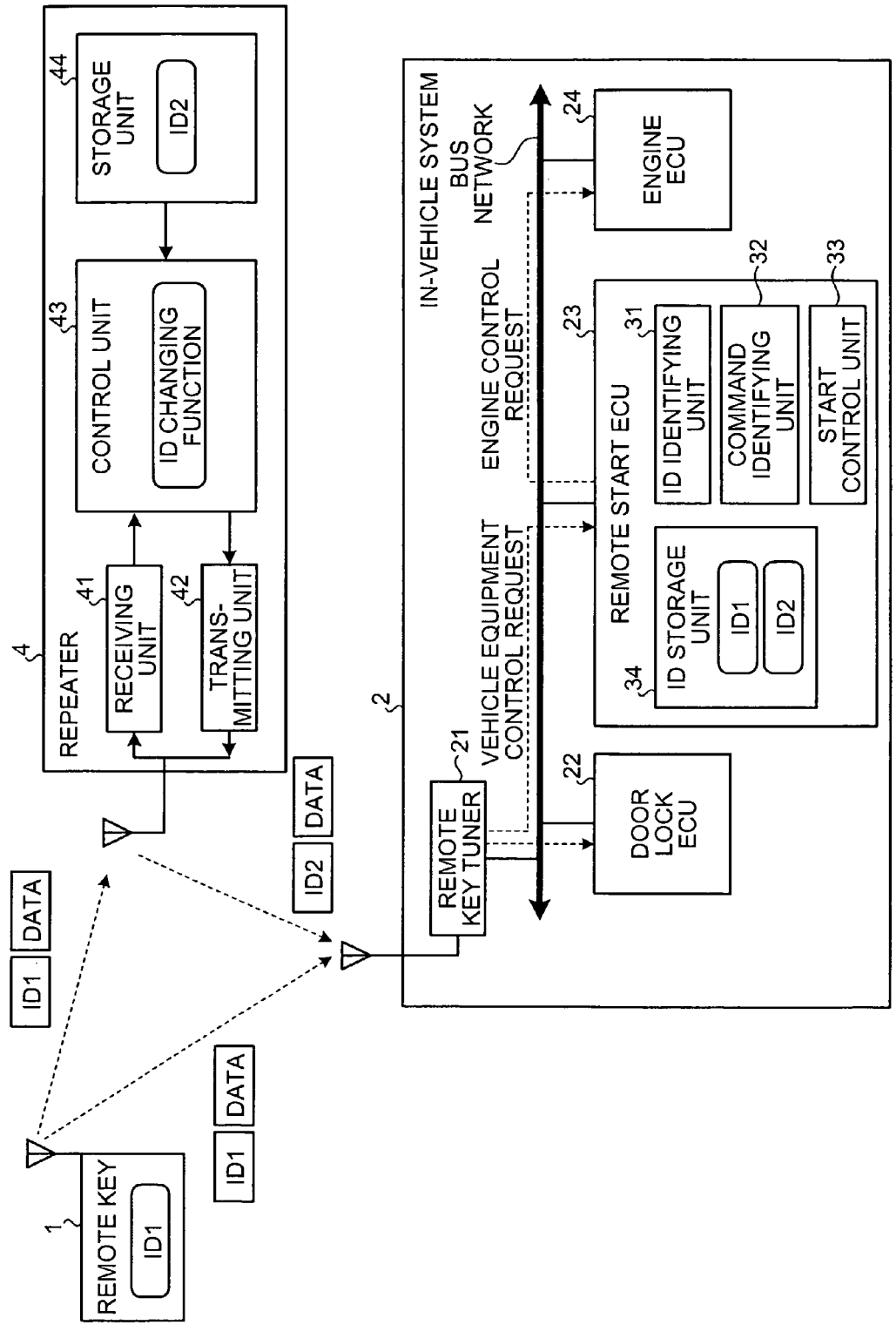
FIG. 1 is a schematic diagram of a remote engine control system according to a first embodiment of the present invention.

FIG. 1 is a schematic diagram of a remote engine control system 100 according to a first embodiment of the present invention. The remote engine control system 100 includes a remote key 1, an in-vehicle system 2, and a repeater 4.

The remote key 1 is a remote operation terminal device, and transmits, when operated by a user, a vehicle equipment control request to the in-vehicle system 2. Examples of the vehicle equipment control request include a request for locking or unlocking a vehicle, an alarm request (i.e., a panic alarm request) for issuing an alarm to people around the vehicle, and a vehicle state request for checking a state of the vehicle. The remote key 1 has a predetermined transmission power for radio communications in a short distance of about 20 meters to 30 meters. The remote key 1 is assigned identification information ID1 for uniquely identifying the remote key 1. The remote key 1 appends the identification information ID1 to a vehicle equipment control request and transmits the vehicle equipment control request.

The repeater 4 is a relay device that relays a vehicle equipment control request received from the remote key 1. The repeater 4 includes a receiving unit 41, a transmitting unit 42, a control unit 43, and a storage unit 44. The transmission power of the repeater 4 is larger than that of the remote key 1. In other words, the repeater 4 can transmit a signal for longer distance longer than the remote key 1. The repeater 4 is assigned identification information ID2. The identification information ID2 is stored in the storage unit 44.

Once the receiving unit 41 receives a vehicle equipment control request, which contains the identification information ID1, from the remote key 1, the control unit 43 replaces the identification information ID1 with the identification information ID2 of the repeater 4. The transmitting unit 42 of the control unit 43 then transmits the updated vehicle equipment control request, which contains the identification information ID2, to the in-vehicle system 2.

The in-vehicle system 2 includes a remote key tuner 21, a door lock electronic control unit (ECU) 22, a remote start ECU 23, and an engine ECU 24. The ECUs are connected to each other via a network. A controller area network (CAN), a local area network (LAN), an in-vehicle bus network such as a FlexRay (hereinafter, "bus network") are the examples of such a network. In addition, a brake ECU (not shown), an electronic power steering ECU (not shown), and the like are connected to the bus network.

The remote key tuner 21 receives an original vehicle equipment control request from the remote key 1 or an updated vehicle equipment control request from the repeater 4 via an antenna and sends the vehicle equipment control request to the bus network.

The door lock ECU 22 controls (i.e., locks or unlocks) the door of the vehicle. The door lock ECU 22 can function as a body ECU having a function for controlling other parts of the vehicle, for example, closing and opening windows of the vehicle, performing ON/OFF control on an antitheft device, or opening the trunk of the vehicle. The door lock ECU 22 controls the door based on a vehicle equipment control request received via the bus network.

Specifically, upon receiving a door locking request as a vehicle equipment control request, the door lock ECU 22 drives a door motor (not shown) to lock the door. Upon receiving a door unlocking request, the door lock ECU 22 drives the door motor to unlock the door. Upon receiving an alarm request, the door lock ECU 22 starts issuing an alarm for people around the vehicle by setting off a horn alarm (not shown).

The engine ECU 24 controls the engine. Specifically, the engine ECU 24 starts the engine in response to connection of an ignition line (IG) thereto. Once detecting that a starter motor (not shown) starts rotating in response to connection of a starter line (ST) thereto, the engine ECU 24 starts and drives the engine by injecting fuel to the engine and igniting the fuel. When the IG is disconnected, the engine ECU 24 stops injecting the fuel and stops the engine.

The engine ECU 24 controls the engine also based on a physical operation such as rotating a key of the vehicle being inserted in a key cylinder, or pushing a switch for connecting or disconnecting the IG or the ST. Alternatively, the engine is controlled in response to an engine control command issued by the remote start ECU 23.

The remote start ECU 23 controls the engine when the user is outside the vehicle (i.e., when the key is not inserted in the key cylinder). The remote start ECU 23 includes an ID identifying unit 31, a command identifying unit 32, a start control unit 33, and an ID storage unit 34.

The ID identifying unit 31 identifies identification information (ID) in a vehicle equipment control request transmitted via the bus network to the in-vehicle system 2. The command identifying unit 32 determines whether the vehicle equipment control request represents a command, and identifies the type of the command. For example, when a door locking request is successively received three times as vehicle equipment control requests (e.g., a button of the remote key 1 is pressed for a short time for the first and second time and pressed for a longer time for the third time), the command identifying unit 32 determines that this combination of the door locking requests represents a command for remotely starting the engine. By using a combination of vehicle equipment control requests as a command, the remote key 1 originally designed to lock and unlock the vehicle or issue an alarm for the area around the vehicle can be used for different control operations. In the above explanation, the command for starting or stopping the engine is cited by way of example and without limitation. Other types of commands can be issued by different combinations of vehicle equipment control requests.

The start control unit 33 remotely controls the engine when the command identifying unit 32 identifies a vehicle equipment control request or a combination thereof as an engine control command (engine start command or engine stop command). Specifically, the start control unit 33 remotely controls the engine by outputting an engine control command to the engine ECU 24.

The ID storage unit 34 stores therein identification information of terminals available for remotely control the engine of the vehicle. Specifically, as shown in FIG. 1, the ID storage unit 34 stores therein the identification information ID1 and ID2 of the remote key 1 and the repeater 4 which are authorized to transmit a vehicle equipment control request to the in-vehicle system 2.

The command identifying unit 32 determines whether a vehicle equipment control request that contains identification information that matches any of those stored in the ID storage unit 34 represents a command, and identifies the type of the command. Specifically, the command determining unit 32 determines a combination of vehicle equipment control requests attached with the same identification information as a command.

Figure 2:
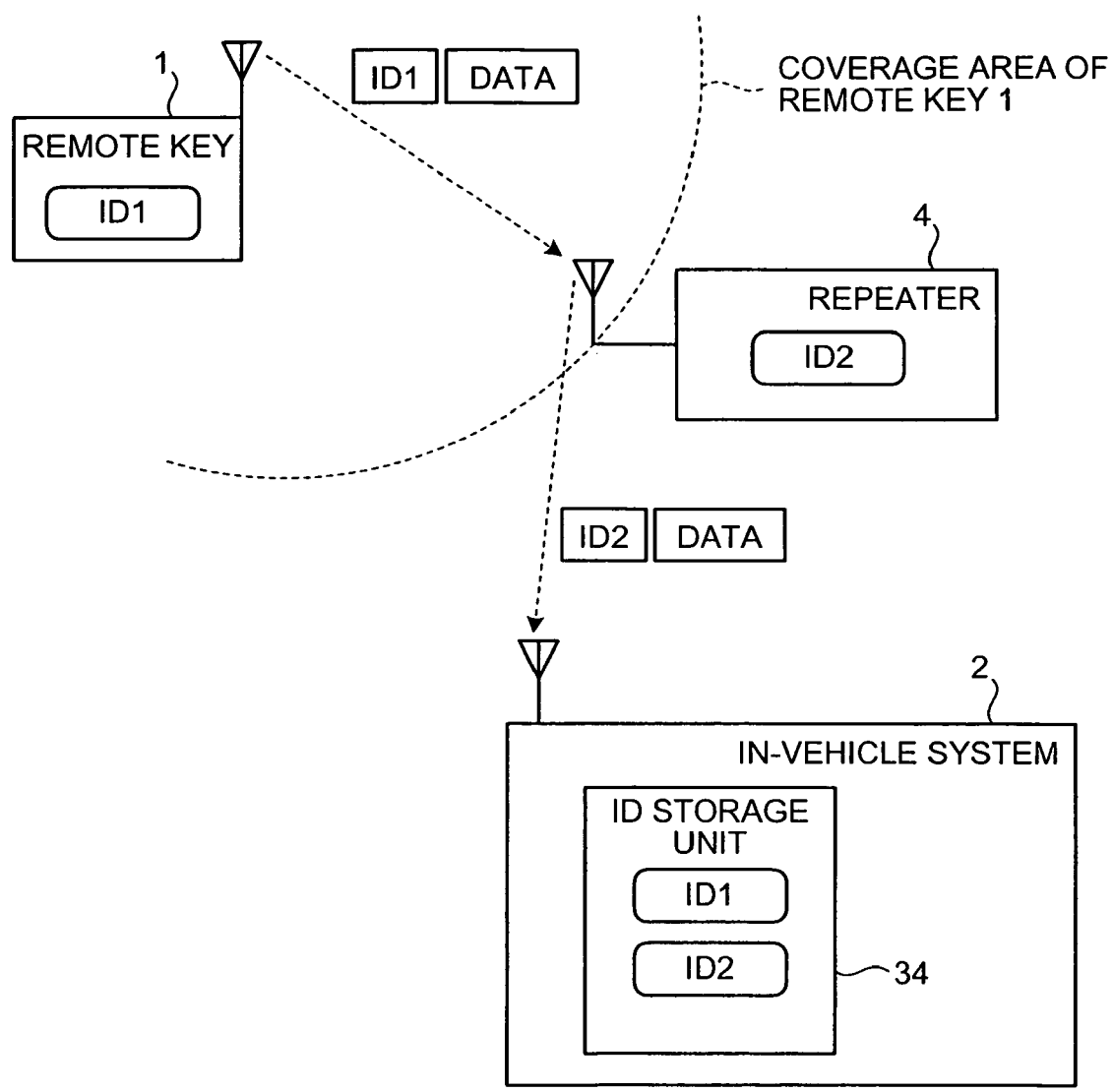
FIG. 2 is a schematic diagram of a situation in which an in-vehicle system is not in a coverage area of a remote key.
Figure 3:
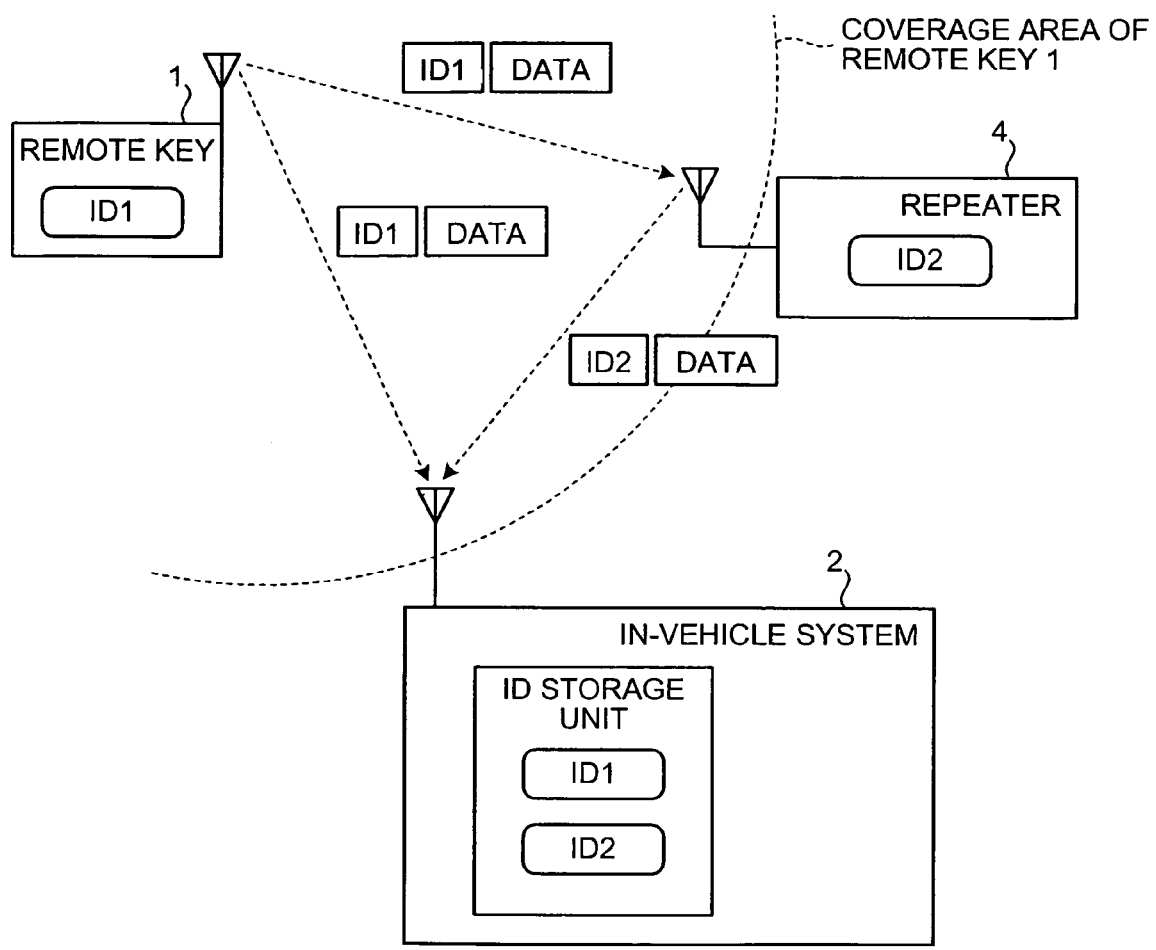
FIG. 3 is schematic diagram of a situation in which the in-vehicle system is in the coverage area of the remote key.

The remote key 1 has a coverage area. The coverage area of the remote key 1 is a range in which the remote key 1 is capable of performing radio communication with the in-vehicle system 2. When the in-vehicle system 2 is outside the coverage area of the remote key 1, as shown in FIG. 2, the in-vehicle system 2 receives only an updated vehicle equipment control request from the repeater 4. However, when the in-vehicle system 2 is in the coverage area of the remote key 1, as shown in FIG. 3, the in-vehicle system 2 receives two vehicle equipment-control requests: an original vehicle equipment control request from the remote key 1 and an updated vehicle equipment control request from the repeater 4.

If the same identification information is present in both the original vehicle equipment control request and the updated vehicle equipment control request, a combination of the vehicle equipment control requests from the remote key 1 and the repeater 4 is mistakenly identified as a command by the command identifying unit 32. To avoid such a mistake, the repeater 4 updates the identification information ID1 in the original vehicle equipment control request with the identification information ID2 thereof when relaying it. The command identifying unit 32 determines whether identification information in each vehicle equipment control request matches the identification information ID1 or ID2 stored in the ID storage unit 34. If the identification information match any identification information stored in the in-vehicle system 2 (ID1 or ID2), the command identifying unit 32 determines that a combination of the vehicle equipment control requests attached with the same identification information represents a command, and identifies the type of the command. Therefore, even when the in-vehicle system 2 is in the coverage area of the remote key 1, the command determining unit 32 can identify the type of a command appropriately.

Figure 4:
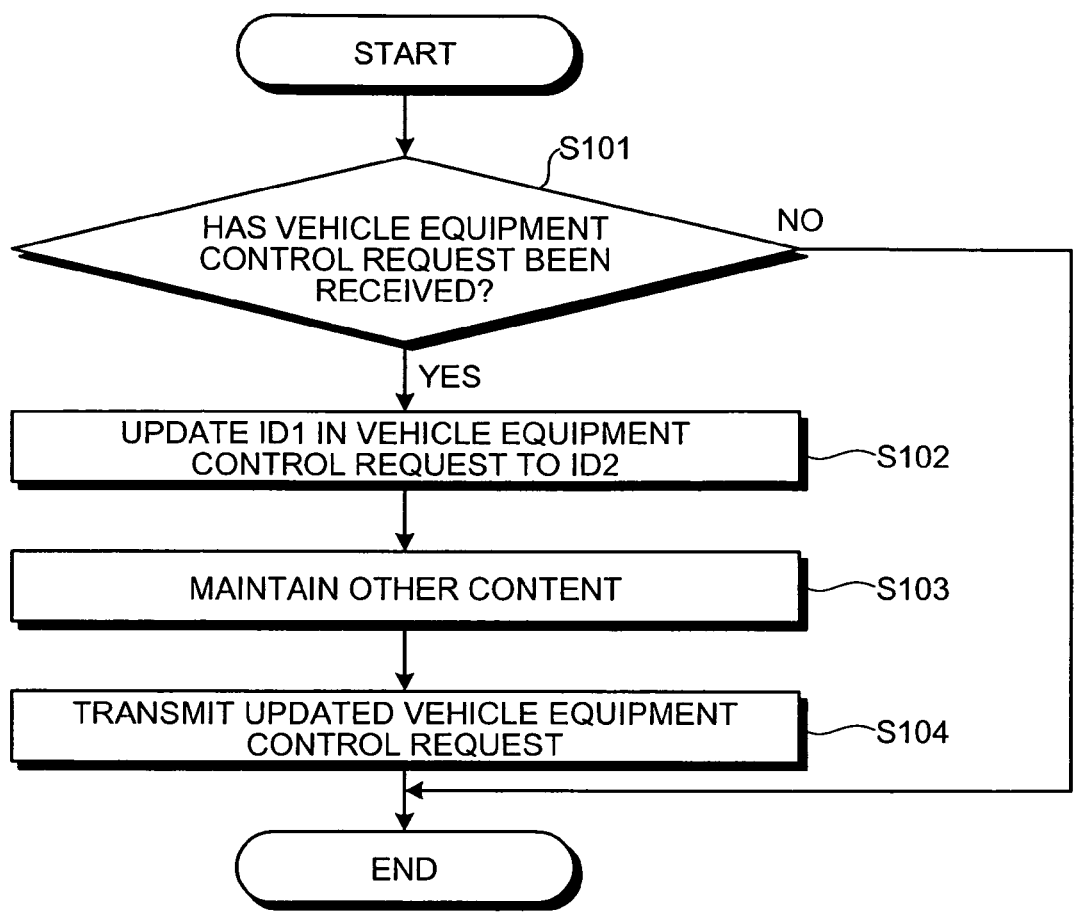
FIG. 4 is a flowchart of a process performed by a repeater shown in FIG. 1.

The process performed by the repeater 4 is explained below with reference to FIG. 4. The repeater 4 performs this process repeatedly at regular or irregular intervals. The repeater 4 determines whether a vehicle equipment control request attached with the identification information ID1 has been received from the remote key 1 (Step S101). When a vehicle equipment control request attached with the identification information ID1 has not been received (NO at Step S101), the repeater 4 completes the process.

On the other hand, when the vehicle equipment control request attached with the identification information ID1 has been received (YES at Step S101), the repeater 4 updates the identification information ID1 in the received vehicle equipment control request with the identification information ID2 (Step S102). The repeater 4 does not change the other content of the vehicle equipment control request (Step S103). Then the repeater 4 transmits the updated vehicle equipment control request to the in-vehicle system 2 (Step S104). Thereafter, the repeater 4 completes the process.

Figure 5:
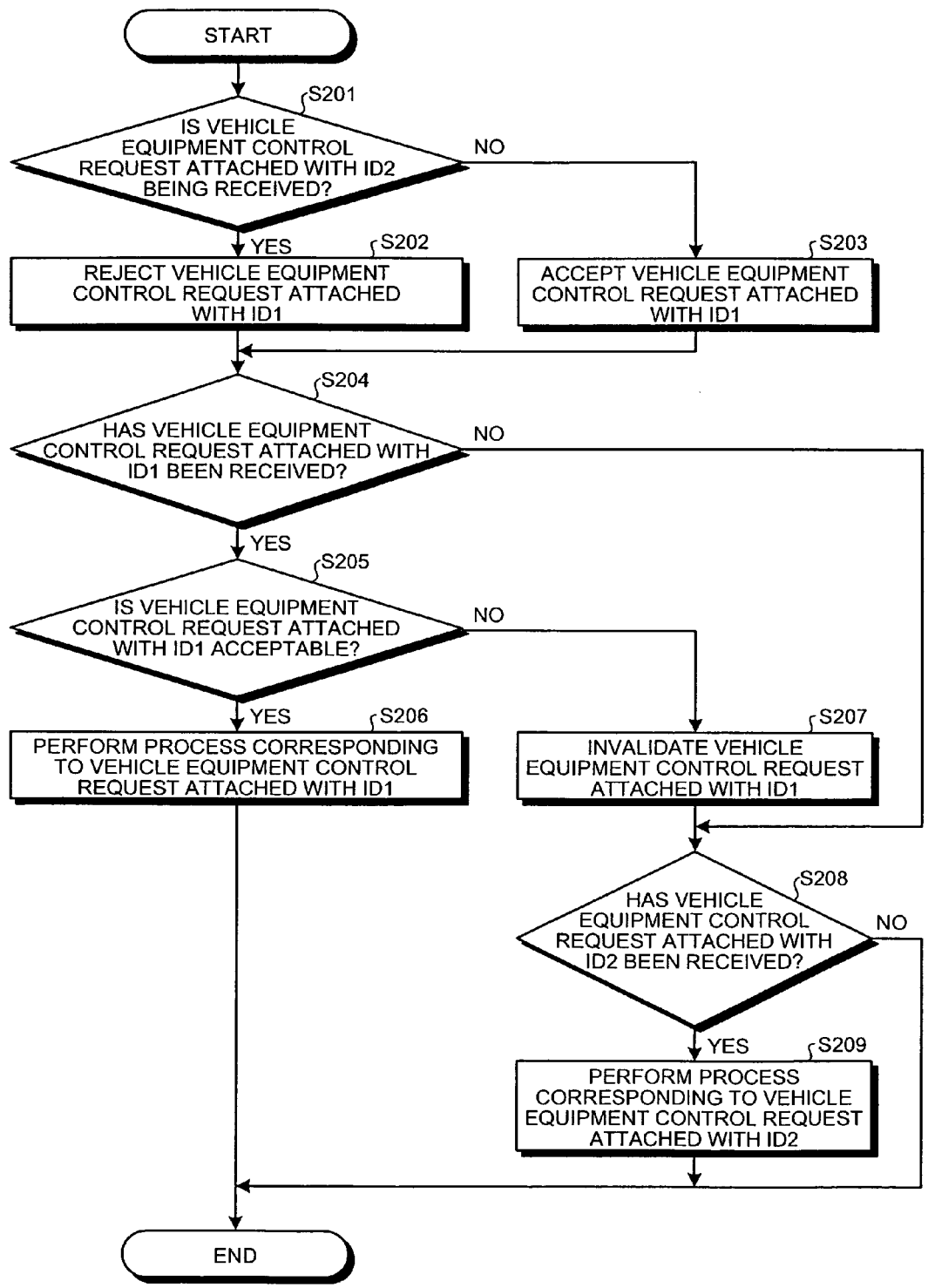
FIG. 5 is a flowchart of a process performed by a remote start ECU shown in FIG. 1.

A process performed by the remote start ECU 23 is explained below with reference to FIG. 5. The remote start ECU 23 performs this process repeatedly at regular or irregular intervals.

The ID identifying unit 31 monitors data on the bus network and determines whether the in-vehicle system 2 has received a vehicle equipment control request attached with the identification information ID2 (Step S201).

When the vehicle equipment control request attached with the identification information ID2 is being received (YES at Step S201), the remote start ECU 23 rejects a vehicle equipment control request attached with the identification information ID1 (Step S202). When a vehicle equipment control request attached with the identification information ID2 is not being received (NO at Step S201), the remote start ECU 23 accepts a vehicle-equipment control request attached with the identification information ID1 (Step S203).

Thereafter, the ID identifying unit 31 determines whether a vehicle equipment control request attached with the identification information ID1 has been received (Step S204). When the vehicle equipment control request attached with the identification information ID1 has been received (YES at Step S204), the ID identifying unit 31 further determines whether a vehicle equipment control request attached with the identification information ID1 is acceptable (Step S205).

When a vehicle equipment control request attached with the identification information ID1 is acceptable (YES at Step S205), a process corresponding to the vehicle equipment control request attached with the identification information ID1 is performed (Step S206), and the process is completed. On the other hand, when a vehicle equipment control request attached with the identification information ID1 is not acceptable (rejected) (NO at Step S205), the vehicle equipment control request attached with the identification information ID1 is invalidated (Step S207).

After Step S207, or when a vehicle equipment control request attached with the identification information ID1 has not been received (NO at Step S204), the ID identifying unit 31 determines whether a vehicle equipment control request attached with the identification information ID2 has been received (Step S208). When a vehicle equipment control request attached with the identification information ID2 has been received (YES at Step S208), a process corresponding to the vehicle equipment control request attached with the identification information ID2 is performed (Step S209), and the process is completed. When a vehicle equipment control request attached with the identification information ID2 has not been received (NO at Step S208), the process is completed.

In the process performed at Steps S206 and S209, the command identifying unit 32 determines whether a combination of vehicle equipment control requests attached with the same identification information represent a command. Upon determining that the vehicle equipment control request represents a command, the command identifying unit 32 identifies the type of the command. Based on the determination by the command identifying unit 32, the start control unit 33 sends a command to the engine ECU 24. For example, when the vehicle equipment control request is an engine control command, the start control unit 33 issues the engine control command to the engine ECU 24.

As described above, according to the first embodiment, when relaying a vehicle equipment control request transmitted from the remote key 1, the repeater 4 updates the identification information ID1 in the original vehicle equipment control request with the identification information ID2 of the repeater 4. In a state where the identification information of the remote key 1 and the identification information of the repeater 4 are stored in the in-vehicle system 2, the repeater 4 determines whether vehicle equipment control requests attached with the same identification information represent a command, and identifies the type of the command. Therefore, an erroneous command can be prevented from being executed while a distance (hereinafter, "remote control distance"), in which the vehicle can be remotely controlled, can be extended by the repeater 4 that relays a signal from the remote key 1 to the in-vehicle system 2.

Figure 6:
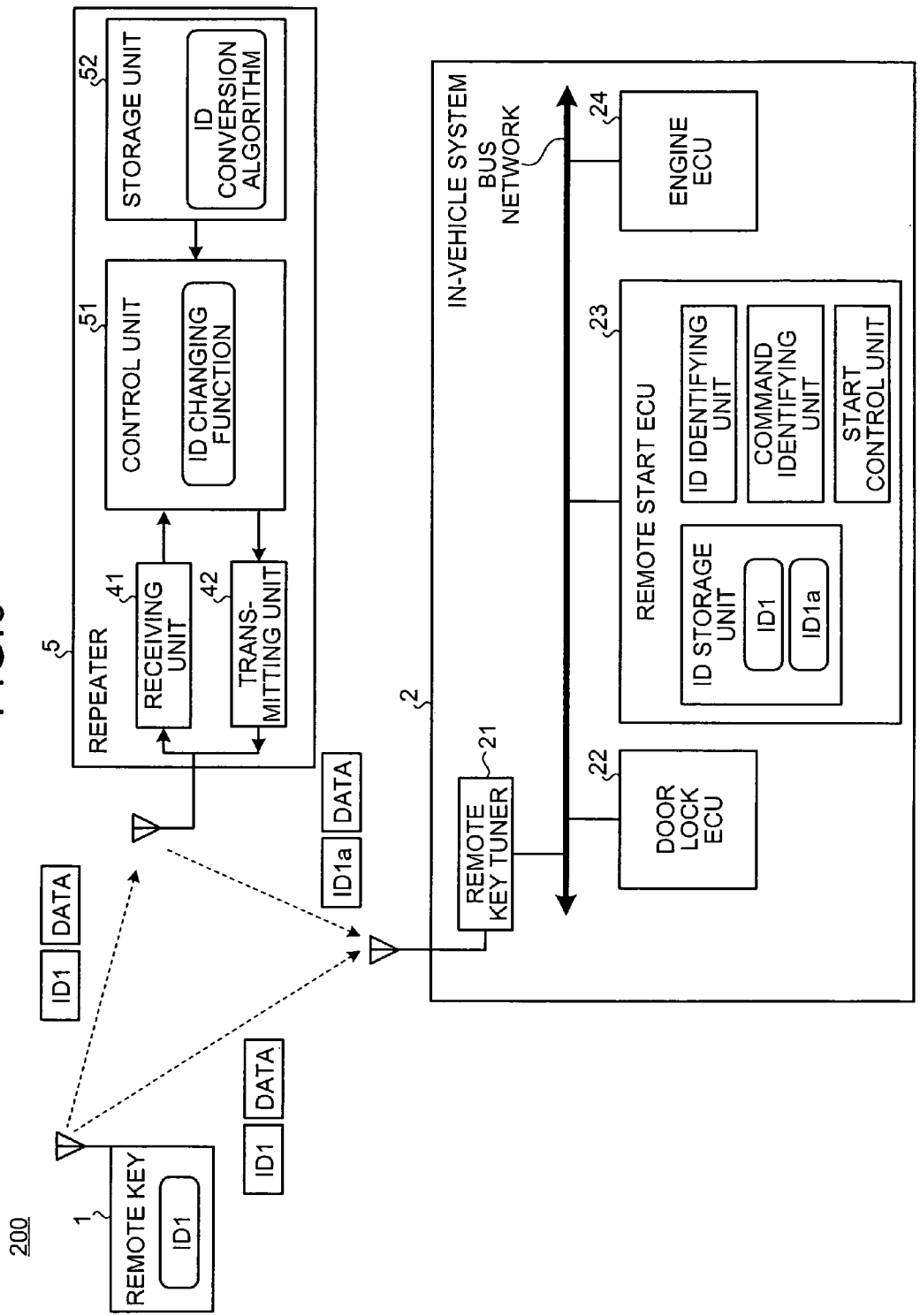
FIG. 6 is a schematic diagram of a remote engine control system according to a second embodiment of the present invention.

FIG. 6 is a schematic diagram of a remote engine control system 200 according to a second embodiment of the present invention. The remote engine control system 200 has basically the same configuration and operates in the same manner as the remote engine control system 100 except for a repeater 5 serving as a relay device. The repeater 5 performs an arithmetic operation on original identification information attached to a vehicle equipment control request received from the remote key 1 to obtain new identification information, and updates the original identification information in the received vehicle equipment control request with the new one, and transmits the updated vehicle equipment control request to the in-vehicle system. The same reference characters refer to corresponding components, and the same explanation is not repeated below.

The repeater 5 includes the receiving unit 41, the transmitting unit 42, a control unit 51, and a storage unit 52. The storage unit 52 does not store therein identification information of the repeater 5 but stores a conversion algorithm f for converting the identification information ID1 to some other identification information ID1$a$. When the repeater 5 receives a vehicle equipment control request attached with the identification information ID1 from the remote key 1, the control unit 51 performs an arithmetic operation on the identification information ID1 using the identification information algorithm f, so that identification information ID1$a$ is obtained. The control unit 51 updates the identification information ID1 with the identification information ID1$a$. Thereafter, the transmitting unit 42 transmits the vehicle equipment control request attached with the identification information ID1$a$ to the in-vehicle system 2.

The in-vehicle system 2 has basically the same configuration as that of the first embodiment except for not storing the identification information of the repeater 5 but storing the identification information ID1$a$ obtained based on the identification information ID1.

By generating identification information ID1$a$ by performing the arithmetic operation on the identification information ID1 of the remote key 1 as explained above, it is possible, as shown in FIG. 7, to relay vehicle equipment control requests between a plurality of combinations of remote keys and a plurality of vehicles (i.e., the remote key 1 and the in-vehicle system 2, and a remote key 6 and an in-vehicle system 7) using a single relay device (i.e., the repeater 5).

Figure 7:
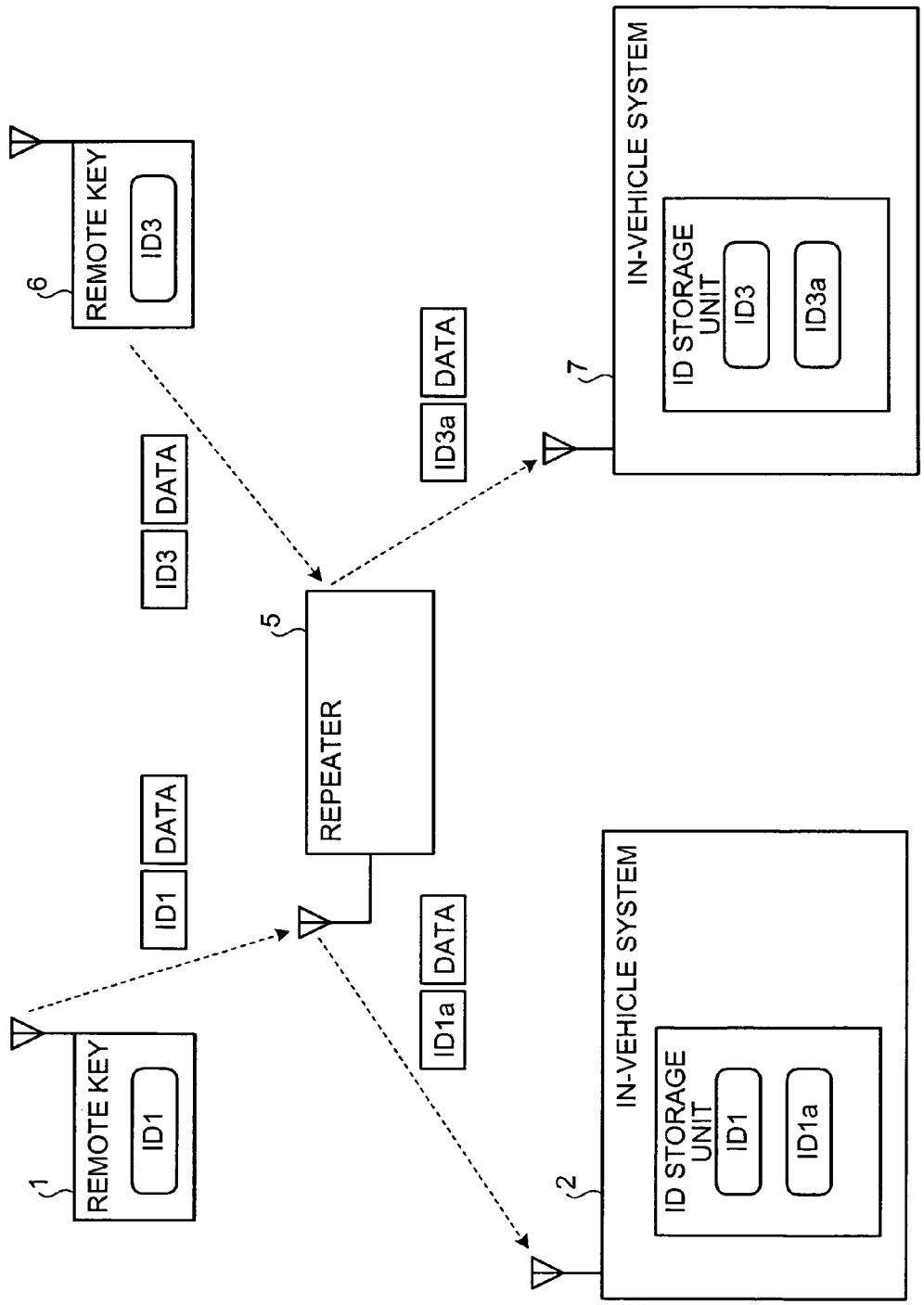
FIG. 7 is a schematic diagram of a remote engine control system including a plurality of combinations of remote keys and in-vehicle systems and a single repeater.

The remote key 1 shown in FIG. 7 corresponds to the in-vehicle system 2 and the remote key 6 corresponds to the in-vehicle system 7. The remote key 1 and the remote key 6 are assigned with the identification information ID1 and identification information ID3, respectively.

Upon receiving a vehicle equipment control request from the remote key 1 or the remote key 6, the repeater 5 performs the arithmetic operation on the identification information (ID1 or ID3) attached thereto by using the same conversion algorithm f. The repeater 5 updates the original identification information (ID1 or ID3) with different identification information (ID1$a$ or ID3$a$) and transmits an updated vehicle-equipment control request containing the different identification information. Because different original identification information (ID1 or ID3) is originally attached to each vehicle equipment control request, the vehicle equipment control requests to be transmitted from the repeater 5 are attached with different new identification information (ID1$a$ and ID3$a$).

Because the in-vehicle system 2 originally stores therein the identification information ID1 and the identification information ID1$a$ and the in-vehicle system 7 originally stores therein the identification information ID3 and the identification information ID3$a$, a single repeater, i.e., the repeater 5, can appropriately perform remote engine start control for each in-vehicle system.

Figure 8:
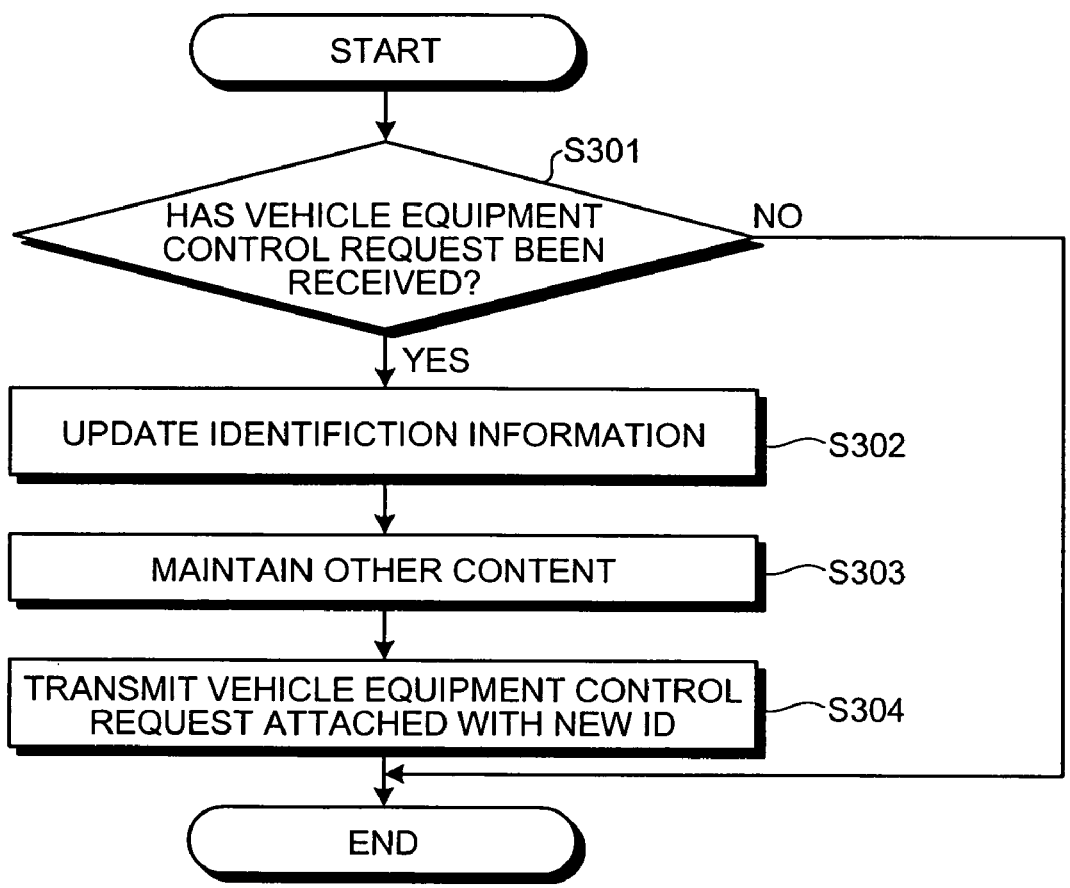
FIG. 8 is a flowchart of a process performed by a repeater shown in FIG. 6.

FIG. 8 is a flowchart of a process performed by the repeater 5. The repeater 5 performs this process repeatedly at regular or irregular intervals. The repeater 5 determines whether a vehicle equipment control request has been received from a remote key (Step S301). When no vehicle equipment control request has been received (NO at Step S301), the repeater 5 completes the process.

When a vehicle equipment control request has been received (YES at Step S301), the repeater 5 performs an arithmetic operation on original identification information attached to the vehicle equipment control request to obtain new identification information, using the identification information algorithm f, and updates the original identification information to the new identification information (Step S302). The repeater 5 does not change the other content of the vehicle equipment control request (Step S303). The repeater 5 transmits the updated vehicle equipment control request to an in-vehicle system (Step S304), and completes the process.

As described above, according to the second embodiment, the repeater 5 updates original identification information in a vehicle equipment control request received from the remote key 1 to different identification information that is generated by performing a predetermined arithmetic operation on the original identification information attached, and relays the updated vehicle equipment control request. In addition, in a state where both of the original identification information and the new identification information obtained by performing the arithmetic operation are stored in the in-vehicle system, the in-vehicle system determines whether a combination of vehicle equipment control requests having the same identification information represents a command, and identifies the type of the command. Therefore, it is possible to prevent an erroneous command from being executed while extending the remote control, by transmitting a signal from the remote key via a relaying device.

The configurations and the operations of the remote engine control systems 100 and 200 are explained above by way of example only, and they can be modified appropriately. For example, although the in-vehicle systems of the first and second embodiments are each configured by directly connecting the remote key tuner to the bus network, a conventional technology can be alternatively adopted to arbitrarily configure the system. For example, a remote key tuner and various types of ECUs can be integrated, or a remote key tuner can be arranged between a door lock ECU and a remote start ECU.

According to the first and second embodiments, when a vehicle equipment control request attached with specific identification information is being received, a vehicle equipment control request attached with identification information different from the specific identification information is rejected and invalidated. Thus, it is possible to prevent the vehicle equipment control requests from being received together and combined.

According to an aspect of the present invention, it is possible to achieve a remote engine control system capable of preventing an erroneous command from being executed and extending a transmission distance of a signal for remotely starting an engine of a vehicle from a remote key by relaying the signal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A remote engine control system that remotely controls an engine of a vehicle, the remote engine control system comprising:

a relay device that receives a vehicle equipment control request containing first identification information (ID) identifying a remote control device, updates the first identification information in the vehicle equipment control request to second identification information identifying the relay device to obtain an updated vehicle equipment control request, and transmits the updated vehicle equipment control request; and an in-vehicle device arranged in the vehicle, the in-vehicle device including a determining unit that identifies whether identification information in a received vehicle equipment control request is the first identification information or the second identification information, and determines whether the vehicle equipment control request is acceptable based on the identified identification information;

a command identifying unit that determines, when the vehicle equipment control request is acceptable, whether the vehicle equipment control request represents a command, and identifies a type of the command; and an engine control unit that remotely controls an engine of the vehicle based on the command, wherein the determining unit accepts a vehicle equipment control request received singularly containing either the first identification information or the second identification information, and rejects a vehicle equipment control request having either the first identification information or the second identification information when the in-vehicle device receives a vehicle equipment control request having the other of the first or second identification information; and wherein the command type is identified by the command identifying unit from a plurality of received vehicle control requests.

2. The remote engine control system according to claim 1, wherein
the second identification information uniquely identifies the relay device, and
the relay device includes a storing unit that stores therein in advance the second identification information.

3. The remote engine control system according to claim 1, wherein the relay device includes an arithmetic operation unit that performs a predetermined arithmetic operation on the first identification information to calculate the second identification information.

4. The remote engine control system according to claim 1, further comprising a portable terminal that transmits the first identification information that uniquely identifies the portable terminal to the relay device as the first remote control device.

5. The remote engine control system according to claim 1, wherein
the vehicle equipment control request includes a radio frequency signal having a frequency.

6. The remote engine control system according to claim 1, wherein the command identifying unit identifies the command based on only a series of vehicle equipment control requests having the same identification information.

7. The remote engine control system according to claim 1, wherein the in-vehicle device includes an identification storage unit that contains both the first identification information and the second identification information.

* * * * *